Patented May 14, 1935

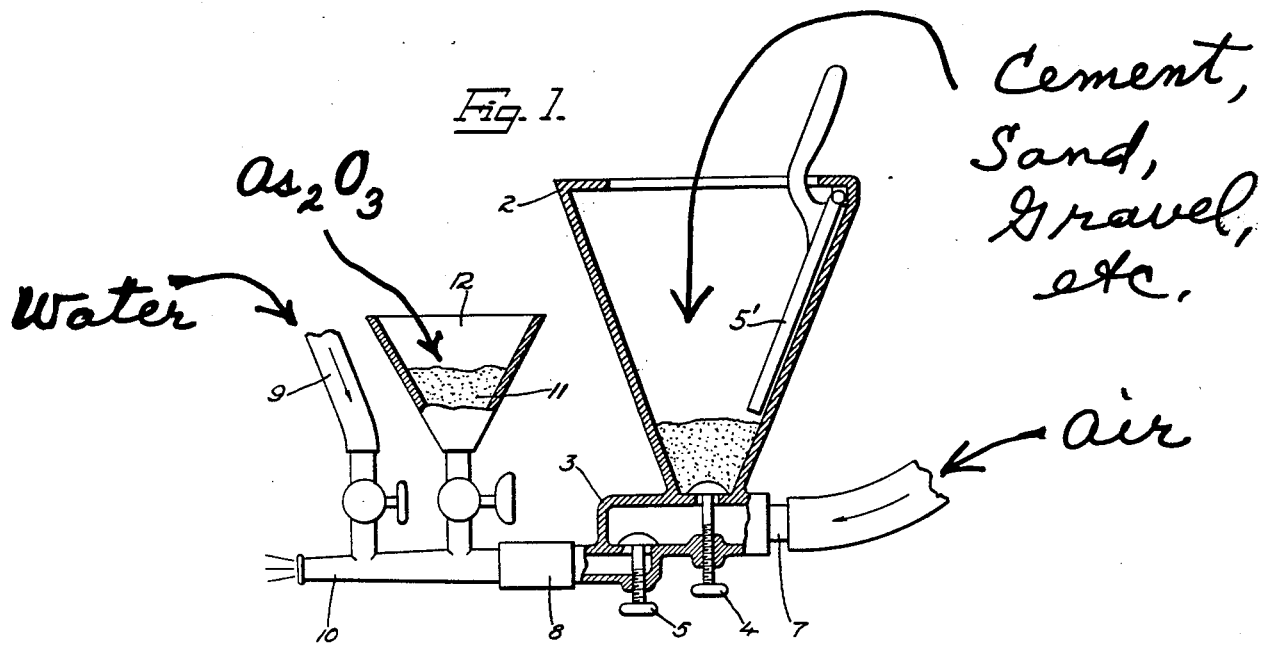
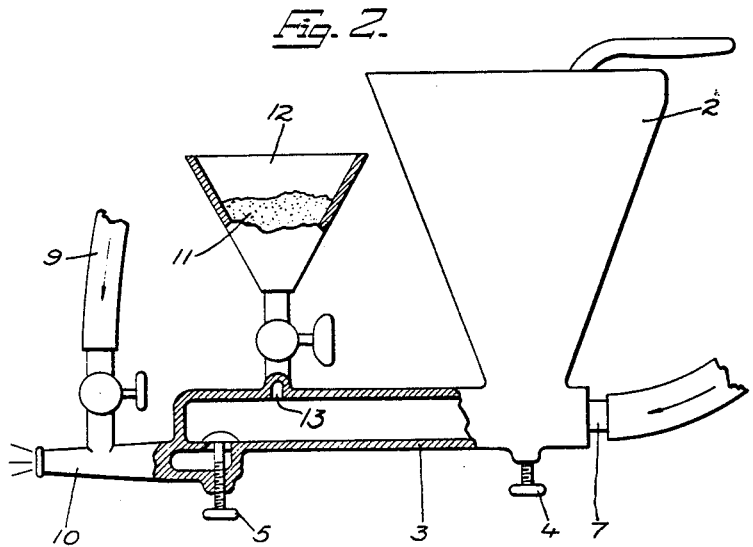

2,001,506

UNITED STATES PATENT OFFICE 2,001,506

ARSENIC-CONTAINING CEMENT

Gösta Johan Jakob Smitt, Vasteras, Sweden, assignor to Bolidens Gruvaktiebolag, Stockholm, Sweden Application October 28, 1933, Serial No. 695,666
In Sweden November 2, 1932

4 Claims. (Cl. 106—24)

This invention relates to a process for making arsenical cement, concrete, or the like, and particularly for controlling the setting thereof.

It is a matter of experience that arsenical cement or concrete, containing as they do, certain compounds of arsenic, set very rapidly with the evolution of heat when water is added thereto, and this usually causes serious trouble during mixing, transportation and application thereof. Should the arsenical compounds be added to the cement before adding the water to the mixture, trouble will also ensue if it is attempted to store such cement for future use.

The object of the invention is therefore to introduce a method of adding the arsenical compound in a manner which will satisfactorily overcome the mentioned disadvantages.

On the other hand, while the particular compounds of arsenic which may be used may be included in the invention, yet it should naturally be an arsenical compound capable of reacting with a substance contained in the cement or mixture thereof.

In the accompanying drawing forming part hereof,

Figure 1 is a diagrammatic section of the essential portions of a spray gun such as is suitable for use in connection with the present invention.

Figure 2 is a modification of the same.

The same reference numerals indicate the same or like parts in both views.

In the practice of my invention, an arsenical compound consisting of arsenious acid ($As_2O_3$), for example, or a substance containing arsenious acid is added to the cement or cement mixture, preferably in a finely divided form, while said cement or mixture thereof is ejected under gas pressure at the place of deposit. As the actual compound of arsenic used is of lesser moment herein, this class being known to some extent as well as practical proportions of the same relatively to the quantity of cement, only one example may be mentioned in passing.

Hence 2, 3 or even 4 parts of $As_2O_3$ may be added to 10 parts of cement and 30 parts of sand, in order to produce arsenical concrete when water is added, the properties of this concrete varying somewhat, as the amount of $As_2O_3$ varies.

The present process may be advantageously used in carrying out cement (concrete) constructions and under cold conditions, no special steps being required for heating the constituents contained in the compound.

The so-called cement spraying method may be advantageously used in mixing and applying the mixture, a cement gun or the like being convenient to use for this purpose, the arsenical compound being added at a suitable place.

The cement spray gun is provided with two chambers 2 and 3, one serving as a working chamber 2 and the other as a sluice 3 for the material. The chambers may be independently closed by means of cup valves 4 and 5. One of the chambers, 2, which is located above the other, may temporarily thus be opened by lowering of cover 5' and connected with the open air to receive the material, which consists of a compound 6 of cement, sand or gravel et cetera. The lower chamber contains arrangements for supplying the material into the hose pipe 8 and a connection 7 for supplying compressed air, so that the material may be blown through the same.

The water is added from hose 9 only at the nozzle 10 of the hose pipe 8 to facilitate the conveyance of the material. The arsenical compound 11 is preferably added at about the same place as the water from a supply 12, and may also be intermingled with the same prior to being introduced into the cement compound. The cement compound being conducted toward the nozzle in a relatively dry or in a naturally moist condition the arsenical compounds may also be added to the cement mixture through a duct 13 as shown in Figure 2 prior to the same being pressed out into the conduit by the compressed air or during the passage through the said conduit.

Having now described my invention, what I claim as new and desire to secure by Letters Patent is:

1. Process for treating cement or a mixture thereof, which consists in ejecting said cement or cement mixture by means of gas pressure in order to apply the same, and simultaneously adding to the cement or mixture during ejection thereof, a supply of material including a compound of arsenic capable of reacting with part of said cement and preferably in a finely divided form immediately adjacent to the point of ejection of said cement or cement mixture.

2. A process according to claim 1, wherein the arsenical compound is arsenious acid.

3. A process according to claim 1, including the step of ejecting the cement or cement mixture by means of a strong air current which supplies the gas pressure, by which air current the arsenic compound is carried and with which the same is intermingled.

4. A process according to claim 1, including the step of adding water with which the arsenic compound is intermingled, simultaneously with the ejection of the cement or cement compound.

GÖSTA JOHAN JAKOB SMITT.